United States Patent Office 3,560,914
Patented Feb. 2, 1971

3,560,914
TRANSDUCER VESSEL
Douglas C. Webb, Falmouth, Mass., assignor to the United States of America as represented by the Secretary of the Navy
Filed July 3, 1968, Ser. No. 744,614
Int. Cl. H04r 17/10
U.S. Cl. 340—10                                   3 Claims

ABSTRACT OF THE DISCLOSURE

A combined pressure vessel and electroacoustical transducer is disclosed wherein the transducer unit serves as a portion of the casing. In one construction, the transducer is an annular member positioned between a pair of hemispheres. All transducer electrical connections are internal and the apparatus consequently can withstand maximum hydrostatic pressures.

---

The invention described herein may be manufactured and used by or for the Government of the United States of America for governmental purposes without the payment of any royalties thereon or therefor.

The present invention relates generally to pressure vessels and, more particularly, to an instrument housing having an integral electroacoustic transducer.

Most oceanographic instruments which employ an electroacoustic transducer in the data transmitting means are designed with this unit physically separated from the housing. With this type of an arrangement, the transducer must be electrically insulated from the seawater environment. Also, the electrical connectors which, for example, energize the transducer usually must pass through the walls of the housing. The necessary apertures which must be formed in the housing for this purpose, besides increasing its cost, constitute a possible source of failure when the apparatus is subjected to extreme hydrostatic pressures.

It is accordingly a primary object of the present invention to provide a combined oceanographic instrument housing and an electroacoustic transducer of relatively simple and inexpensive construction.

Another object of the present invention is to provide an electroacoustic transducer assembly which can withstand extreme hydrostatic pressures.

A still further object of the present invention is to provide a general purpose oceanographic instrument housing which includes an electroacoustic transducer whose control conductors are all internally located.

Other objects, advantages and novel features of the invention will become apparent from the following detailed description of the invention when considered in conjunction with the accompanying drawings wherein.

Figure 1:
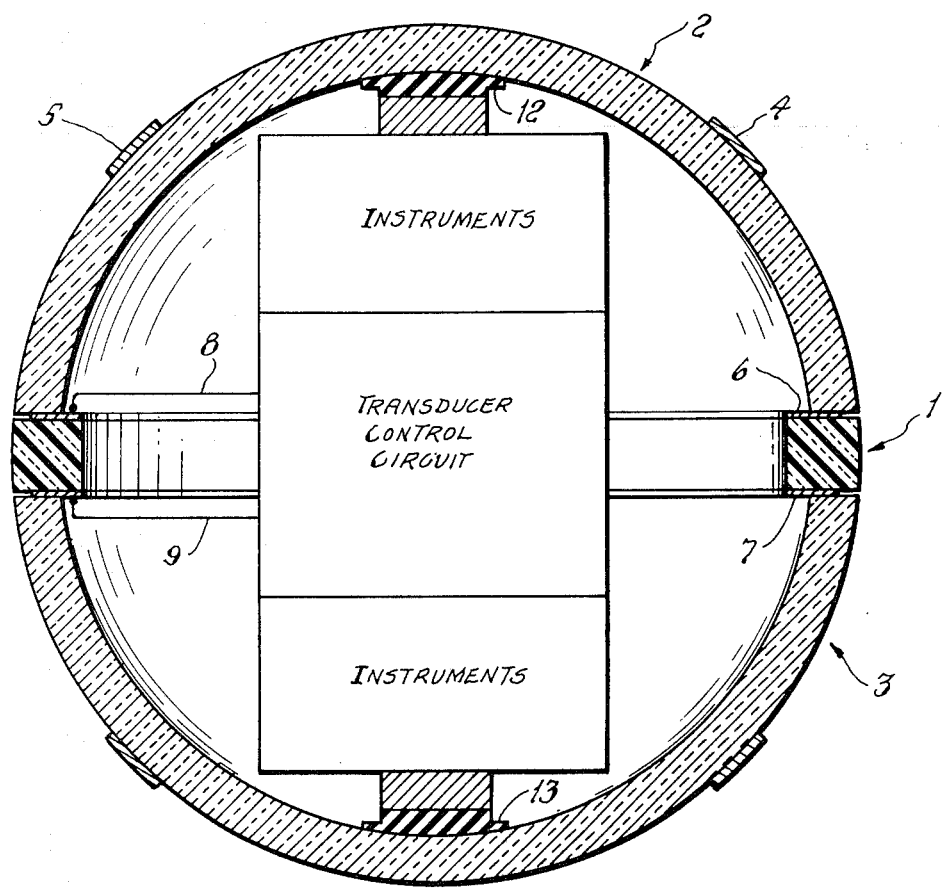
FIG. 1 illustrates one modification of the present invention wherein the instrument housing is of spherical shape.

Referring now to FIG. 1 of the drawings, it will be seen that the complete apparatus consists of a ring-shaped transducer 1, which may be a piezoelectric member of ceramic construction, and a pair of hemispherical closure caps 2 and 3, all held together by external clamps 4 and 5 to form a spherical housing. Appropriate gaskets, not shown, may be inserted between these members to insure the watertight integrity of the apparatus.

Suitable metallic electrodes 6 and 7 are bonded to the opposite faces of ring 1. These electrodes terminate a spaced distance away from the outer rim portion of the ring to prevent their possible shorting by the seawater. Ring 1 has a width greater than the wall thickness of the hemispherical closure caps 2 and 3 so that an inner rim portion thereof extends within the housing. The electrical conductors, such as 8 and 9, which excite the transducer when it is in an active mode and serve as the signal output means when it is in a passive mode, are connected to this rim portion of the transducer. These connections, it will be appreciated, are all internal. Consequently, both hemispherical end caps are free of any feedthrough apertures.

The transducer is polarized to change its radial dimension when energized. The exciting apparatus, and any other oceanographic instruments which are to be accommodated within the housing, are supported in a unitary manner at the nodal positions of the vibrating structure. In other words, when transducer 1 is excited, the complete spherical assembly is set in vibration, and this vibration is in a particular mode, depending upon, for example, the driving frequency and the various physical parameters of the system. The simplest of these modes is ascertained and all of the internal apparatus which is to be accommodated within the housing is supported at the nodal points of this mode. In FIG. 1 suction cups, such as 12 and 13, are employed for this purpose. This simple method of attachment, it will be recognized, also does not require any alterations to the wall portions of hemispherical caps 2 and 3.

End caps 2 and 3, therefore, may be molded glass units of appropriate thickness. Since each shell, as noted hereinbefore, is completely free of any electrical feedthrough or any other type of aperture or cutout which might serve as a stress concentration site when the housing is subjected to extreme hydrostatic pressures, there is little likelihood of the assembly rupturing or otherwise failing at extreme depths.

When transducer 1 is excited, as mentioned hereinbefore, the whole case is set into oscillation and, thus, excellent acoustic coupling to the surrounding fluid medium is realized.

The apparatus of the present invention may be made neutrally buoyant and employed to study, for example, the circulation of water masses of a given density. In another mode of operation, the oceanographic instruments accommodated within the housing may utilize the transducer portion of the assembly as a data transmitter to send temperature information, for example, to a remote receiving station. Also, the assembly may be used as a deep oceanographic beacon or a navigational aid.

Figure 2:
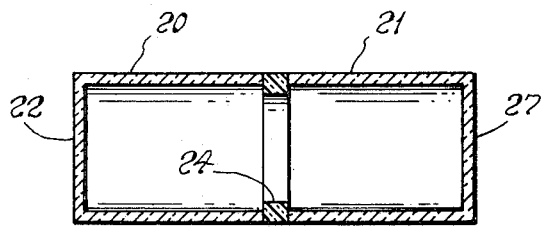
FIG. 2 shows an alternative arrangement with the casing of cylindrical shape with flat end caps.
Figure 3:
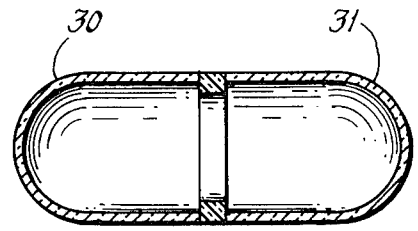
FIG. 3 shows another modification where domed end caps are employed.

FIG. 2 shows an alternative modification where the end caps 20 and 21 are cylindrical units having flat end walls 22 and 23. Here, again, a ring transducer 24 is employed between these end caps to form an integral portion of the overall housing. In FIG. 3 the end caps 30 and 31 have dome-shaped portions and, it will be appreciated that any other suitable geometries may be used.

Obviously, many modifications and variations of the present invention are possible in the light of the above teachings. It is therefore to be understood that within the scope of the appended claims the invention may be practiced otherwise than as specifically described.

What is claimed is:
1. A transducer vessel comprising:
   a ring-shaped piezoelectric element;
   a pair of hemispherical shell members releasably secured to opposite faces of said element and forming therewith a hollow, spherical enclosure,
      the radial thickness of said piezoelectric element being greater than the wall thickness of said shell members whereby an inner rim portion of said piezoelectric element is exposed and projects into the interior of said spherical enclosure; and means for energizing said pieozelectric element so as to set said spherical enclosure vibrating.

2. In an arrangement as defined in claim 1 wherein electrodes are applied to the opposite faces of said piezoelectric element; and electrical conductors are attached to said electrodes at the inner rim portions of said piezoelectric element.

3. In an arrangement as defined in claim 1 wherein said means for energizing said piezoelectric element is accommodated within said spherical enclosure and is supported at locations corresponding to the nodal points of the vibration mode.

References Cited

UNITED STATES PATENTS

| | | | |
|---|---|---|---|
| 2,966,656 | 12/1960 | Bigbie et al. | 340—10 |
| 3,100,291 | 8/1963 | Abbott | 340—10 |
| 3,215,977 | 11/1965 | Williams et al. | 340—10 |
| 3,221,296 | 11/1965 | Milne | 340—10 |
| 3,230,504 | 1/1966 | Horan et al. | 340—10 |
| 3,266,011 | 8/1966 | Massa | 340—10 X |

RODNEY D. BENNETT, JR., Primary Examiner

B. L. RIBANDO, Assistant Examiner